UNITED STATES PATENT OFFICE.

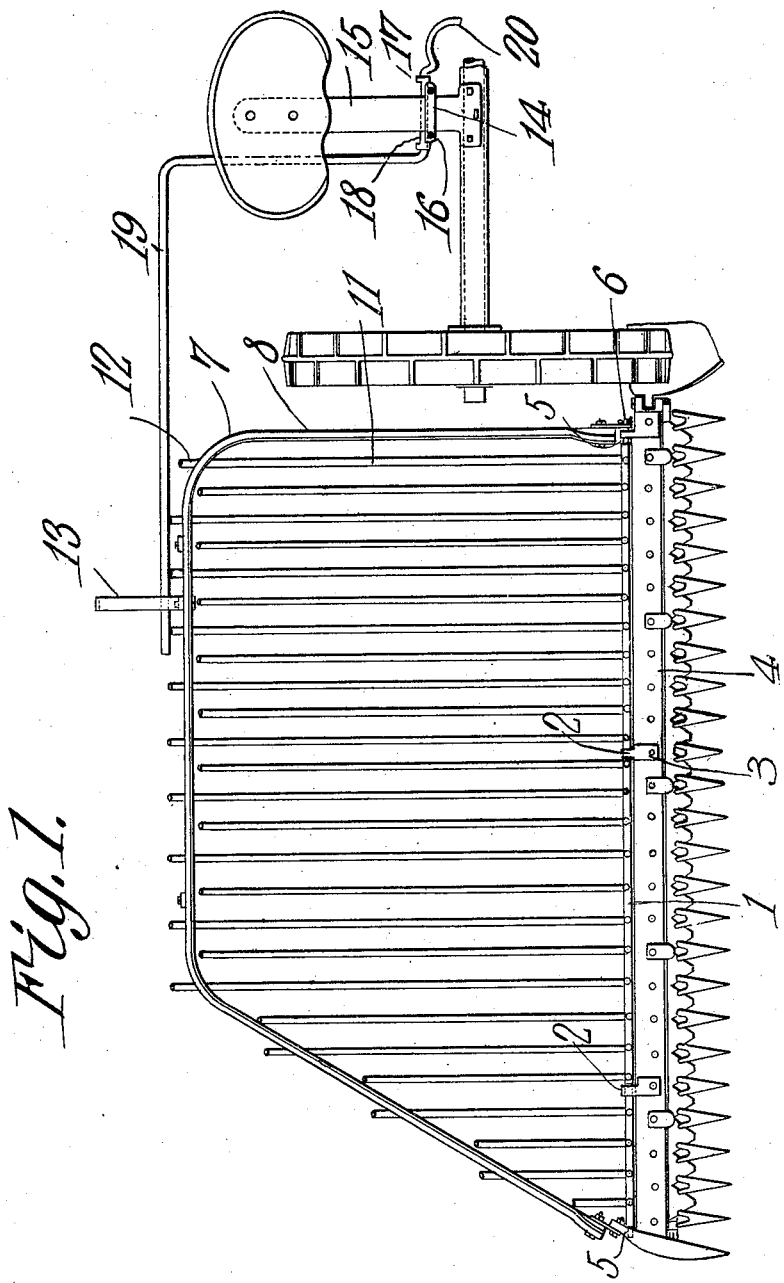

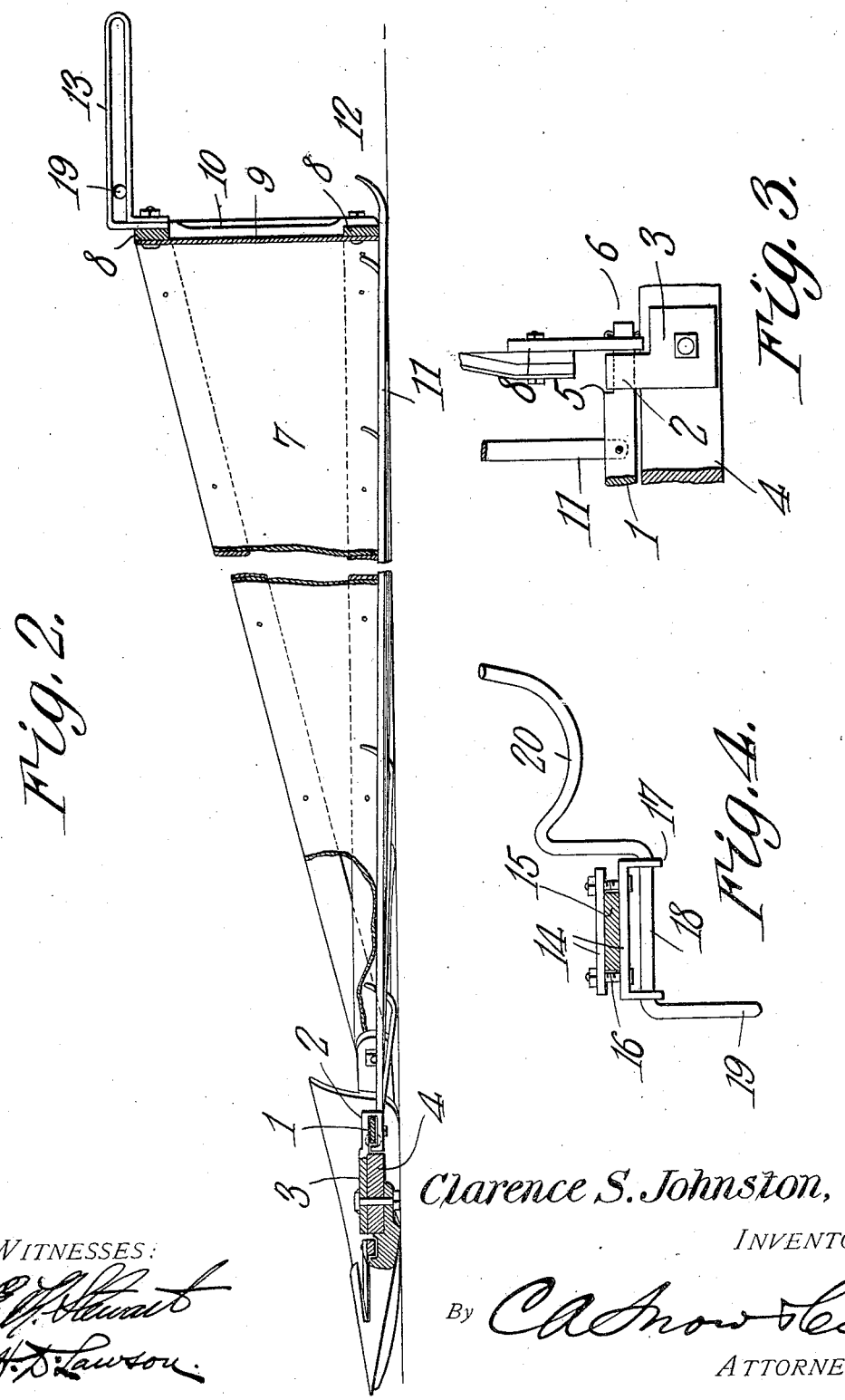

CLARENCE SHERMAN JOHNSTON, OF GLENDIVE, MONTANA.

HAY GATHERER AND DROPPER.

No. 862,335.  Specification of Letters Patent.  Patented Aug. 6, 1907.

Application filed March 20, 1907. Serial No. 363,480.

*To all whom it may concern:*

Be it known that I, CLARENCE SHERMAN JOHNSTON, a citizen of the United States, residing at Glendive, in the county of Dawson and State of Montana, have invented a new and useful Hay Gatherer and Dropper, of which the following is a specification.

This invention has relation to hay gatherers and droppers for mowers and it consists in the novel construction and arrangement of its parts as hereinafter shown and described.

The object of the invention is to provide a gatherer and dropper which may be easily and readily applied to a mower and the parts of which are of such construction and so positioned as not to interfere with the movement of the mower or any of its parts or in the performance of their functions.

In the accompanying drawing:—Figure 1 is a top plan view of the dropper. Fig. 2 is a sectional elevation of the same. Fig. 3 is a plan view of a portion of the guard rail and dropper bar, and Fig. 4 is an edge elevation of the seat post clamp and shaft journaled thereto.

The gatherer and dropper comprises the bar 1 which passes through the eyes 2 of the plates 3. The said plates are suitably secured to the guard rail 4 of the mower and are disposed rearwardly with relation to the same and have their eyes 2 located below the upper surface of the rail 4. The bar 1 is retained against longitudinal movement in the eyes 2 by means of the shoulders 5 one of which bears laterally against the side of the inner plate 3 and the other bears against the side of the grain divider located at the end of the rail 4. The extreme ends of the bar 1 are cylindrical as at 6. The catcher 7 is substantially U-shaped in plan and consists of the lower and upper edge pieces 8 which are connected together by metallic wall 9. The said edge pieces 8 come together at their ends but the said pieces are spaced apart from each other at their intermediate portions. The catcher 7 is provided at intervals with the braces 10 which are attached at their opposite ends to the pieces 8. The slats 11 are pivoted at their forward ends to the bar 1 and may swing horizontally with relation to the said bar. The rear ends of the slats 11 are upwardly curved as at 12. The said slats are arranged in two sets, one long and the other short, and alternately positioned, so that the ends of the shorter slats lie within the catcher 7 and the ends of the longer slats lie beyond the outer side of the said catcher. The elongated loop 13 extends rearwardly from the intermediate portion of the catcher 7. The clamp members 14 are held in place against the seat post 15 by the bolts 16. One of the said members 14 is provided with the perforated lug 17 in which is journaled the shaft 18. The said shaft is provided with a crank end 19, the outer portion of which passes through the loop 13. The opposite end of the shaft 18 is provided with a foot-trip or treadle 20.

The operation of the gatherer and dropper is as follows: As the mower cuts the hay it falls upon the slats 11 and is retained thereon by the catcher 7. The hay is prevented from forcing its way between the longer slats 11 and the said catcher by the upturned ends of the shorter slats 11 which lie within the said catcher. In as much as the said slats 11 are confined to swing laterally only upon their pivots the said slats will move up and away from the ground when the guard rail 4 is swung up to avoid a stump or other obstruction. When, however, the mower is making a turn (at which time the catcher should be raised as hereinbefore described) the said slats may swing laterally on their pivots and remain in contact with the surface of the ground without danger of being broken or twisted. When it is desired to deposit the hay previously gathered upon the slats the operator presses down with his foot upon the trip end 20 of the shaft 18 which partially rotates the said shaft and elevates the crank end 19 thereof. The said crank end, passing through the loop 13, raises the said loop and the rear portion of the catcher 7. The said elongated loop compensating for the different arcs described by the crank end 19 of the shaft and the catcher 7 as they do not have their centers or pivots in alinement. Also when the guard rail 4 is swung up the loop 13 may move longitudinally along the crank end 19 of the said shaft. If at any time the hay confined within the catcher 7 should begin to rotate by reason of its having contact with the surface of the ground through the spaces between the slats and during such rotary movement tend to lift the catcher 7 the operator may prevent the lifting of the catcher by bringing the calf of his leg against the trip portion 20 of the shaft 18 and thus retain the said shaft from rotation which in turn through its crank end will hold the said catcher down against the lifting tendency of the revolving hay. Thus it will be observed that an attachment is provided which in no manner interferes with the movement of the mower and the operation of its several parts and that the attachment may be easily and readily operated by the operator without leaving his seat.

Having described my invention what I claim as new and desire to secure by Letters-Patent is:—

1. A mower attachment comprising a bar, means for attaching the bar to a guard rail of a mower, slats pivoted to the bar but having lateral movement only, a catcher pivoted to the bar and a shaft for raising the catcher.

2. A mower attachment comprising a bar, means for attaching the bar to the guard rail of the mower, slats pivoted to the bar but confined to swing laterally only, a catcher pivoted to the bar and confined to swing at right angles to the direction in which the slats swing and means for swinging the catcher.

3. The combination of a mower, a bar, means for attaching the bar to the guard rail of the mower, slats attached to the bar, a catcher pivoted to the bar and lying over the slats, an elongated loop attached to the catcher, a shaft journaled upon the mower and having a trip end and a crank end, said crank end passing through said loop.

In testimony that I claim the foregoing as my own, I have hereto affixed my signature in the presence of two witnesses.

CLARENCE SHERMAN JOHNSTON.

Witnesses:
T. T. HAGAN,
M. J. HUGHES.